US012446983B2

United States Patent
Heiliger et al.

(10) Patent No.: US 12,446,983 B2
(45) Date of Patent: Oct. 21, 2025

(54) ARTICULATION MECHANISMS FOR SURGICAL INSTRUMENTS SUCH AS FOR USE IN ROBOTIC SURGICAL SYSTEMS

(71) Applicant: Covidien LP, Mansfield, MA (US)

(72) Inventors: Zachary S. Heiliger, Nederland, CO (US); Russell W. Holbrook, Longmont, CO (US); William Whitney, Boulder, CO (US); Jason G. Weihe, Longmont, CO (US); Dylan R. Kingsley, Broomfield, CO (US); Crystal A. Adams, Westminster, CO (US); Curtis M. Siebenaller, Frederick, CO (US)

(73) Assignee: Covidien LP, Mansfield, MA (US)

( * ) Notice: Subject to any disclaimer, the term of this patent is extended or adjusted under 35 U.S.C. 154(b) by 707 days.

(21) Appl. No.: 17/014,426

(22) Filed: Sep. 8, 2020

(65) Prior Publication Data
US 2022/0071724 A1   Mar. 10, 2022

(51) Int. Cl.
*A61B 34/00*   (2016.01)
*A61B 34/37*   (2016.01)

(52) U.S. Cl.
CPC ............. *A61B 34/71* (2016.02); *A61B 34/37* (2016.02); *A61B 34/74* (2016.02); *A61B 2034/715* (2016.02)

(58) Field of Classification Search
CPC ......... A61B 34/71; A61B 34/37; A61B 34/74; A61B 2034/715; A61B 2034/305; A61B 2034/306
USPC .......................................................... 606/1
See application file for complete search history.

(56) References Cited

U.S. PATENT DOCUMENTS

| 5,752,973 A | 5/1998 | Kieturakis |
| 5,792,135 A | 8/1998 | Madhani et al. |
| 5,848,986 A | 12/1998 | Lundquist et al. |
| 6,817,974 B2 | 11/2004 | Cooper et al. |

(Continued)

FOREIGN PATENT DOCUMENTS

| EP | 3476359 A1 | 5/2019 |
| WO | 2019136345 A1 | 7/2019 |
| WO | 2019191413 A1 | 10/2019 |

OTHER PUBLICATIONS

International Search Report and Written Opinion issued in corresponding International Application No. PCT/US2021/046411 dated Jan. 24, 2022, 21 pages.

*Primary Examiner* — Niketa Patel
*Assistant Examiner* — Sebastian X Lukjan (57) ABSTRACT

A surgical instrument includes a housing, an articulating shaft, and an end effector assembly extending from the articulating shaft. Tensioning a first articulation cable and slackening a second articulation cable articulates the end effector assembly in a first direction and the opposite articulates the end effector assembly in a second, opposite direction. An articulation mechanism includes first and second capstans including proximal end portions of the first and second articulation cables at least partially wound thereabout. The first capstan is configured to rotate in a first direction to wind up the proximal end portion of the first articulation cable to tension the first articulation cable and in a second direction to unwind the proximal end portion of the first articulation cable to slacken the first articulation cable. The second capstan acts in an opposite manner to tension and slacken the second articulation cable.

14 Claims, 5 Drawing Sheets

(56) References Cited

U.S. PATENT DOCUMENTS

| | | |
|---|---|---|
| 7,799,028 B2 | 9/2010 | Schechter et al. |
| 7,861,906 B2 | 1/2011 | Doll et al. |
| 7,918,230 B2 | 4/2011 | Whitman et al. |
| 8,579,176 B2 | 11/2013 | Smith et al. |
| 9,055,961 B2 | 6/2015 | Manzo et al. |
| 9,474,569 B2 | 10/2016 | Manzo et al. |
| 10,731,740 B1 | 8/2020 | Cui et al. |
| 2002/0099371 A1 | 7/2002 | Schulze et al. |
| 2002/0177842 A1 | 11/2002 | Weiss |
| 2003/0125734 A1 | 7/2003 | Mollenauer |
| 2003/0208186 A1 | 11/2003 | Moreyra |
| 2006/0022015 A1 | 2/2006 | Shelton et al. |
| 2006/0025811 A1 | 2/2006 | Shelton |
| 2006/0161138 A1 | 7/2006 | Orban et al. |
| 2007/0233052 A1 | 10/2007 | Brock |
| 2008/0001559 A1* | 1/2008 | Schena ............... G11B 15/605 318/68 |
| 2008/0015631 A1 | 1/2008 | Lee et al. |
| 2008/0134812 A1 | 6/2008 | Murata |
| 2010/0016853 A1* | 1/2010 | Burbank ............ A61B 18/1445 606/48 |
| 2010/0170362 A1* | 7/2010 | Bennett ............ A61B 17/32002 901/21 |
| 2010/0274265 A1 | 10/2010 | Wingardner et al. |
| 2010/0292691 A1 | 11/2010 | Brogna |
| 2011/0118707 A1 | 5/2011 | Burbank |
| 2011/0118708 A1 | 5/2011 | Burbank et al. |
| 2011/0118709 A1 | 5/2011 | Burbank |
| 2011/0118754 A1 | 5/2011 | Dachs, II et al. |
| 2012/0071895 A1* | 3/2012 | Stahler ................. A61B 34/20 606/130 |
| 2013/0123783 A1 | 5/2013 | Marczyk et al. |
| 2014/0276723 A1 | 9/2014 | Parihar et al. |
| 2015/0011830 A1* | 1/2015 | Hunter ................ A61B 1/0016 600/118 |
| 2015/0051619 A1* | 2/2015 | Cooper ................ A61B 34/30 606/130 |
| 2017/0042560 A1 | 2/2017 | Lee et al. |
| 2017/0150975 A1 | 6/2017 | Bozung |
| 2017/0252096 A1 | 9/2017 | Felder et al. |
| 2017/0265951 A1 | 9/2017 | Grover et al. |
| 2017/0273749 A1 | 9/2017 | Grover et al. |
| 2017/0365923 A1 | 12/2017 | Schmutzler et al. |
| 2018/0028271 A1 | 2/2018 | Rockrohr |
| 2018/0071037 A1 | 3/2018 | Grover et al. |
| 2018/0085177 A1* | 3/2018 | Akbar ................. A61B 10/02 |
| 2019/0008600 A1 | 1/2019 | Pedros et al. |
| 2019/0099227 A1 | 4/2019 | Rockrohr |
| 2019/0125467 A1* | 5/2019 | Evans ................. B25J 9/1689 |
| 2019/0167267 A1* | 6/2019 | Kobayashi ....... A61B 17/07207 |
| 2019/0274769 A1 | 9/2019 | Perdue et al. |
| 2020/0060516 A1* | 2/2020 | Baez, Jr. ............... A61B 34/70 |
| 2020/0237453 A1 | 7/2020 | Anglese |
| 2020/0237455 A1 | 7/2020 | Anglese |
| 2020/0246058 A1 | 8/2020 | Traina |
| 2020/0253676 A1 | 8/2020 | Traina |
| 2020/0261166 A1 | 8/2020 | Anglese |
| 2020/0261167 A1 | 8/2020 | Anglese |
| 2020/0261168 A1 | 8/2020 | Anglese |
| 2020/0315728 A1* | 10/2020 | Johnson ................ A61B 34/71 |
| 2021/0244427 A1* | 8/2021 | Lee ....................... A61B 17/29 |
| 2022/0280253 A1* | 9/2022 | He ........................ A61B 34/71 |

\* cited by examiner

ARTICULATION MECHANISMS FOR SURGICAL INSTRUMENTS SUCH AS FOR USE IN ROBOTIC SURGICAL SYSTEMS

FIELD

The present disclosure relates to surgical instruments and, more specifically, to articulation mechanisms for surgical instruments such as for use in robotic surgical systems.

BACKGROUND

Robotic surgical systems are increasingly utilized in various different surgical procedures. Some robotic surgical systems include a console supporting a robotic arm. One or more different surgical instruments may be configured for use with the robotic surgical system and selectively mountable to the robotic arm. The robotic arm provides one or more inputs to the mounted surgical instrument to enable operation of the mounted surgical instrument.

Some robotic surgical instruments and systems incorporate rotation features, thus enabling rotation of the end effector of the surgical instrument to a desired orientation within the surgical site. However, even in such instruments and systems, the ability to navigate within a surgical site via rotation and manipulation alone is limited.

SUMMARY

As used herein, the term "distal" refers to the portion that is being described which is further from an operator (whether a human surgeon or a surgical robot), while the term "proximal" refers to the portion that is being described which is closer to the operator. The terms "about," "substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Provided in accordance with aspects of the present disclosure is a surgical instrument including a housing, a shaft extending distally from the housing, an end effector assembly, first and second articulation cables, and an articulation mechanism. The shaft includes a proximal section defining a longitudinal axis and an articulating section extending distally from the proximal section. The end effector assembly extends distally from the articulating section of the shaft. The articulating section of the shaft is configured to articulate the end effector assembly relative to the proximal section of the shaft. The first and second articulation cables extend from the housing and through the proximal section of the shaft to or through the articulating section of the shaft. Tensioning the first articulation cable and slackening the second articulation cable articulates the end effector assembly in a first direction while slackening the first articulation cable and tensioning the second articulation cable articulates the end effector assembly in a second, opposite direction. The articulation assembly is disposed within the housing and includes an articulation mechanism. The articulation mechanism includes a first capstan including a proximal end portion of the first articulation cable at least partially wound thereabout. The first capstan is configured to rotate in a first direction to wind up the proximal end portion of the first articulation cable to tension the first articulation cable and in a second direction to unwind the proximal end portion of the first articulation cable to slacken the first articulation cable. The articulation mechanism further includes a second capstan including a proximal end portion of the second articulation cable at least partially wound thereabout. The second capstan is configured to rotate in the first direction to unwind the proximal end portion of the second articulation cable to slacken the second articulation cable and in the second direction to wind up the proximal end portion of the second articulation cable to tension the second articulation cable.

In an aspect of the present disclosure, one or both of the first and second capstans defines an axis of rotation that is substantially perpendicular relative to the longitudinal axis of the proximal section of the shaft.

In another aspect of the present disclosure, one or both of the first and second articulation cables extends from the respective first and second capstans in substantially parallel orientation relative to the longitudinal axis of the proximal section of the shaft.

In still another aspect of the present disclosure, one or both of the first and second articulation cables extends from the respective first and second capstans in overlapping relation with a cylindrical volume defined by the proximal section of the shaft.

In yet another aspect of the present disclosure, the articulation mechanism further includes an active input shaft configured to receive a rotational input and to rotate in response thereto. In such aspects, the active input shaft may be operably coupled to the first and second capstans such that rotation of the active input shaft rotates the first and second capstans in the same direction as one another.

In still yet another aspect of the present disclosure, the active input shaft includes a gear meshed with a gear of the first capstan to directly transfer rotational motion thereto. Alternatively or additionally, the articulation mechanism further includes a gear set and passive input shaft operably coupled between the active input shaft and the second capstan to indirectly transfer rotational motion thereto.

Another surgical instrument provided in accordance with aspects of the present disclosure includes a housing, a shaft extending distally from the housing, an end effector assembly, first and second articulation cables, and an articulation mechanism. The shaft includes a proximal section defining a longitudinal axis and an articulating section extending distally from the proximal section. The end effector assembly extends distally from the articulating section of the shaft. The articulating section of the shaft is configured to articulate the end effector assembly relative to the proximal section of the shaft. The first and second articulation cables extend from the housing and through the proximal section of the shaft to or through the articulating section of the shaft. Tensioning the first articulation cable and slackening the second articulation cable articulates the end effector assembly in a first direction while slackening the first articulation cable and tensioning the second articulation cable articulates the end effector assembly in a second, opposite direction. The articulation assembly is disposed within the housing and includes an articulation mechanism. The articulation mechanism includes an active input shaft configured to receive a rotational input and to rotate in response thereto, and a swashplate assembly operably disposed about the active input shaft and operably coupled to proximal end portions of the first and second articulation cables such that rotation of the active input shaft tensions the first articulation cable while slackening the second articulation cable or slackens the first articulation cable while tensioning the second articulation cable.

In an aspect of the present disclosure, the swashplate assembly includes a first plate fixedly engaged about the active input shaft at an oblique angle relative thereto. The swashplate assembly may further include a second plate rotatably disposed about the active input shaft and positioned distally adjacent the first plate such that rotation of the first plate in response to rotation of the active input shaft tilts the second plate.

In another aspect of the present disclosure, the first and second plates are rotatably coupled by a plurality of bearings.

In yet another aspect of the present disclosure, the proximal end portions of the first and second articulation cables are coupled to diametrically opposing portions of the second plate. More specifically, the proximal end portions of the first and second articulation cables may be coupled to the diametrically opposing portions of the second plate via pivot joints.

In still another aspect of the present disclosure, third and fourth articulation cables extend from the housing and through the proximal section of the shaft to or through the articulating section of the shaft whereby tensioning the third articulation cable and slackening the fourth articulation cable articulates the end effector assembly in a third direction while slackening the third articulation cable and tensioning the fourth articulation cable articulates the end effector assembly in a fourth direction opposite the third direction.

In still yet another aspect of the present disclosure, the articulation assembly includes another articulation mechanism including an active input shaft configured to receive a rotational input and to rotate in response thereto, and a swashplate assembly operably disposed about the active input shaft and operably coupled to proximal end portions of the third and fourth articulation cables such that rotation of the active input shaft tensions the third articulation cable while slackening the fourth articulation cable or slackens the third articulation cable while tensioning the fourth articulation cable. In aspects, the first and second directions are yaw directions while the third and fourth directions are pitch directions.

BRIEF DESCRIPTION OF THE DRAWINGS

Various aspects and features of the present disclosure are described hereinbelow with reference to the drawings wherein.

DETAILED DESCRIPTION

Figure 1:
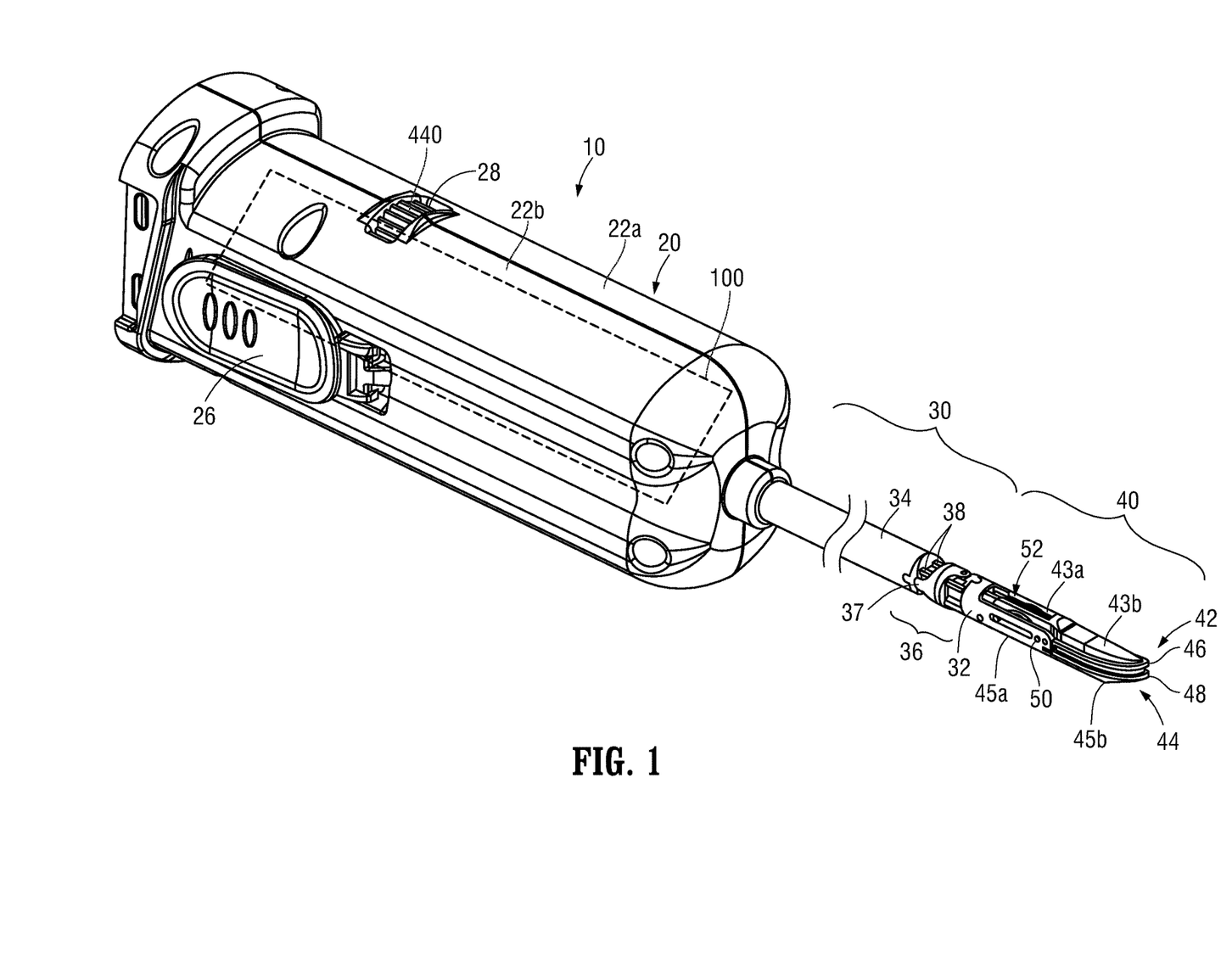
FIG. 1 is a perspective view of a surgical instrument in accordance with the present disclosure configured for mounting on a robotic arm of a robotic surgical system.
Figure 2:
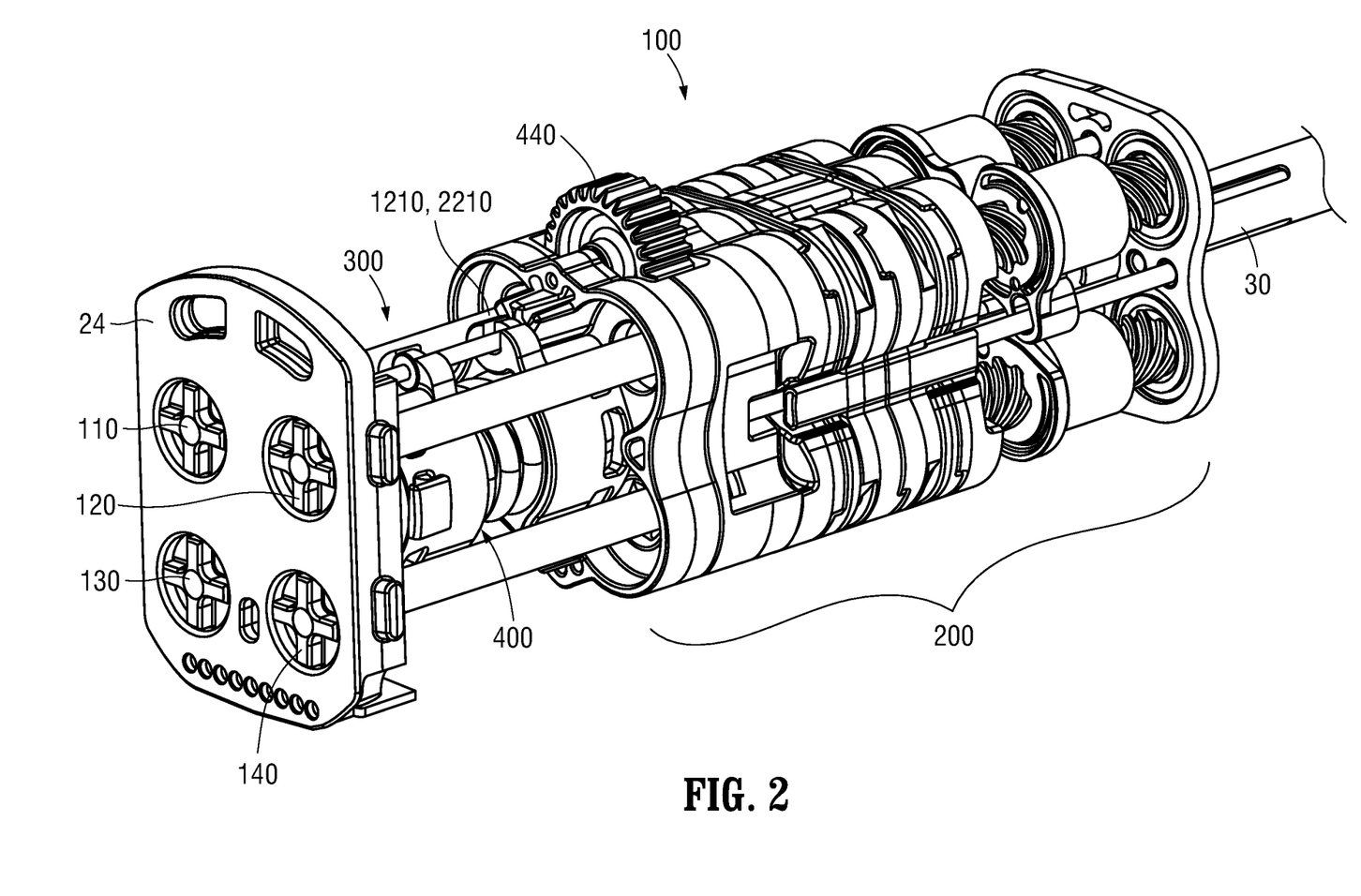
FIG. 2 is a rear perspective view of a proximal portion of the surgical instrument of FIG. 1 with an outer housing removed.
Figure 3:
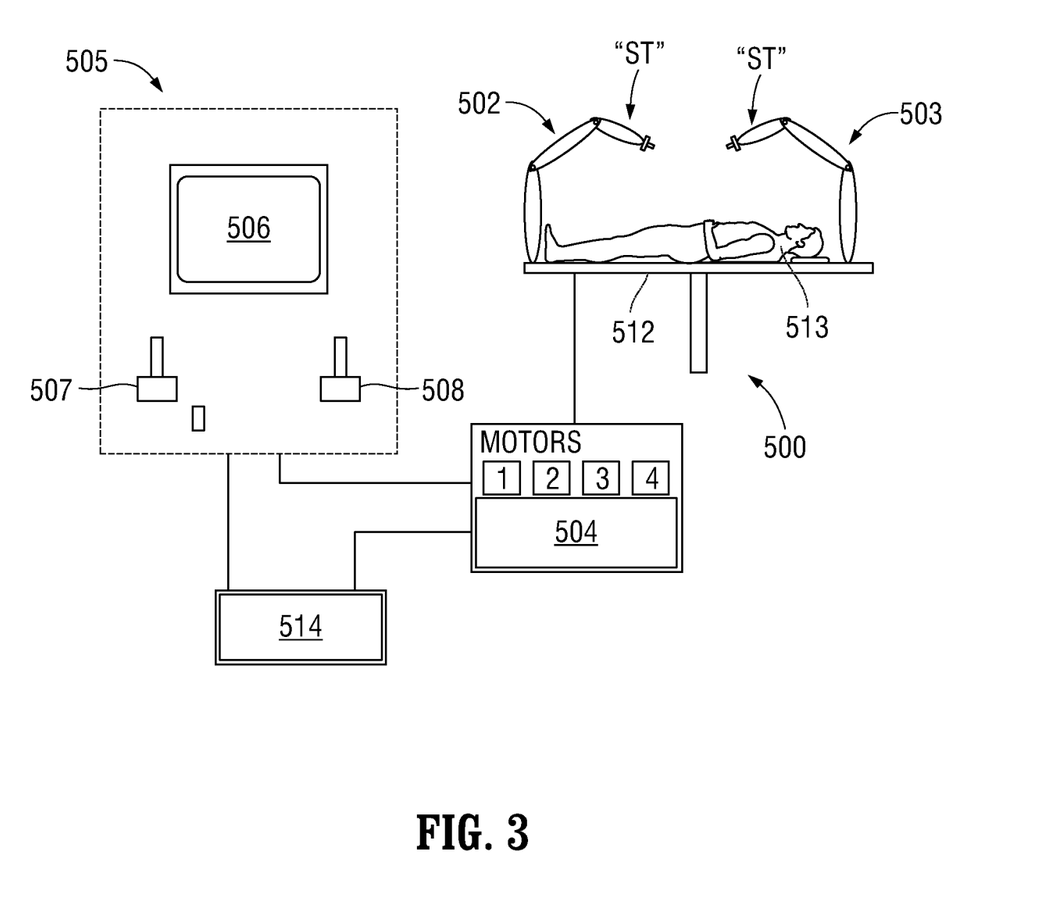
FIG. 3 is a schematic illustration of an exemplary robotic surgical system configured to releasably receive the surgical instrument of FIG. 1.

Referring to FIGS. 1 and 2, a surgical instrument 10 provided in accordance with the present disclosure generally includes a housing 20, a shaft 30 extending distally from housing 20, an end effector assembly 40 extending distally from shaft 30, and an actuation assembly 100 disposed within housing 20 and operably associated with shaft 30 and end effector assembly 40. Instrument 10 is detailed herein as an articulating electrosurgical forceps configured for use with a robotic surgical system, e.g., robotic surgical system 500 (FIG. 3). However, the aspects and features of instrument 10 provided in accordance with the present disclosure, detailed below, are equally applicable for use with other suitable surgical instruments (including non-robotic surgical instrument) and/or in other suitable surgical systems (including non-robotic surgical systems).

Housing 20 of instrument 10 includes first and second body portion 22a, 22b and a proximal face plate 24 (FIG. 2) that cooperate to enclose actuation assembly 100 therein. Proximal face plate 24 includes apertures defined therein through which inputs 110-140 of actuation assembly 100 extend. A pair of latch levers 26 (only one of which is illustrated in FIG. 1) extends outwardly from opposing sides of housing 20 and enables releasable engagement (directly or indirectly) of housing 20 with a robotic arm of a surgical system, e.g., robotic surgical system 500 (FIG. 3). An aperture 28 defined through housing 20 permits thumbwheel 440 to extend therethrough to enable manual manipulation of thumbwheel 440 from the exterior of housing 20 to permit manual opening and closing of end effector assembly 40.

Shaft 30 of instrument 10 includes a distal segment 32, a proximal segment 34, and an articulating section 36 disposed between the distal and proximal segments 32, 34, respectively. Articulating section 36 includes one or more articulating components 37, e.g., links, joints, etc. A plurality of articulation cables 38, e.g., four (4) articulation cables, or other suitable actuators, extends through articulating section 36. More specifically, articulation cables 38 are operably coupled to distal segment 32 of shaft 30 at the distal ends thereof and extend proximally from distal segment 32 of shaft 30, through articulating section 36 of shaft 30 and proximal segment 34 of shaft 30, and into housing 20, wherein articulation cables 38 operably couple with an articulation assembly 200 of actuation assembly 100 to enable selective articulation of distal segment 32 (and, thus end effector assembly 40) relative to proximal segment 34 and housing 20, e.g., about at least two axes of articulation (yaw and pitch articulation, for example). Articulation cables 38 are arranged in a generally rectangular configuration, although other suitable configurations are also contemplated.

With respect to articulation of end effector assembly 40 relative to proximal segment 34 of shaft 30, actuation of articulation cables 38 is affected in pairs. More specifically, in order to pitch end effector assembly 40, the upper pair of cables 38 is actuated in a similar manner while the lower pair of cables 38 is actuated in a similar manner relative to one another but an opposite manner relative to the upper pair of cables 38. With respect to yaw articulation, the right pair of cables 38 is actuated in a similar manner while the left pair of cables 38 is actuated in a similar manner relative to one another but an opposite manner relative to the right pair of cables 38. Thus, cables 38 of diagonally-opposed pairs of cables 38 are always actuated in opposite manners relative to one another and, accordingly, cables 38 of an opposing pair of cables 38 may be inversely coupled to reduce a number of requisite inputs. More specifically, only two inputs are required: a first input, e.g., input 110, for yaw articulation, and a second input, e.g., input 120, for pitch articulation.

End effector assembly 40 includes first and second jaw members 42, 44, respectively. Each jaw member 42, 44 includes a proximal flange portion 43a, 45a and a distal body portion 43b, 45b, respectively. Distal body portions 43b, 45b define opposed tissue-contacting surfaces 46, 48, respectively. Proximal flange portions 43a, 45a are pivotably coupled to one another about a pivot 50 and are operably coupled to one another via a cam-slot assembly 52 including a cam pin slidably received within cam slots defined within the proximal flange portion 43a, 45a of at least one of the jaw members 42, 44, respectively, to enable pivoting of jaw member 42 relative to jaw member 44 and distal segment 32 of shaft 30 between a spaced-apart position (e.g., an open position of end effector assembly 40) and an approximated position (e.g. a closed position of end effector assembly 40) for grasping tissue between tissue-contacting surfaces 46, 48. As an alternative to this unilateral configuration, a bilateral configuration may be provided whereby both jaw members 42, 44 are pivotable relative to one another and distal segment 32 of shaft 30.

A longitudinally-extending channel (not shown) defined within one or both of jaw members 42, 44 is configured for receipt of a selectively advanceable cutting element (not shown) to enable cutting of tissue grasped between tissue-contacting surfaces 46, 48 of jaw members 42, 44, respectively. A cutting drive assembly 300 (FIG. 2) of actuation assembly 100 provides for selective actuation of the cutting element through jaw members 42, 44 to cut tissue grasped between tissue-contacting surfaces 46, 48. Cutting drive assembly 300 (FIG. 2) is operably coupled between a cutting drive bar 302 (FIG. 6), which coupled to the cutting element, and third input 130 of actuation assembly 100 such that, upon receipt of appropriate rotational input into third input 130, cutting drive assembly 300 correspondingly reciprocates cutting drive bar 302 (FIG. 6) to thereby reciprocate the cutting element between jaw members 42, 44 to cut tissue grasped between tissue-contacting surfaces 46, 48.

Continuing with reference to FIGS. 1 and 2, a drive rod 402 (FIG. 6) is operably coupled to cam-slot assembly 52 of end effector assembly 40, e.g., engaged with the cam pin thereof, such that longitudinal actuation of drive rod 402 (FIG. 6) pivots jaw member 42 relative to jaw member 44 between the spaced-apart and approximated positions. More specifically, urging drive rod 402 (FIG. 6) proximally pivots jaw member 42 relative to jaw member 44 towards the approximated position while urging the drive rod distally pivots jaw member 42 relative to jaw member 44 towards the spaced-apart position. However, other suitable mechanisms and/or configurations for pivoting jaw member 42 relative to jaw member 44 between the spaced-apart and approximated positions in response to selective actuation of drive rod 402 (FIG. 6) are also contemplated. Drive rod 402 (FIG. 6) extends proximally from end effector assembly 40 through shaft 30 and into housing 20 wherein drive rod 402 (FIG. 6) is operably coupled with a jaw drive assembly 400 of actuation assembly 100 (FIG. 2) to enable selective actuation of end effector assembly 40 to grasp tissue therebetween and apply a closure force within an appropriate jaw closure force range.

Tissue-contacting surfaces 46, 48 of jaw members 42, 44, respectively, are at least partially formed from an electrically conductive material and are energizable to different potentials to enable the conduction of electrical energy through tissue grasped therebetween, although tissue-contacting surfaces 46, 48 may alternatively be configured to supply any suitable energy, e.g., thermal, microwave, light, ultrasonic, etc., to tissue grasped therebetween for energy-based tissue treatment. Instrument 10 defines a conductive pathway (not shown) through housing 20 and shaft 30 to end effector assembly 40 that may include lead wires, contacts, and/or electrically-conductive components to enable electrical connection of tissue-contacting surfaces 46, 48 of jaw members 42, 44, respectively, to an energy source (not shown), e.g., an electrosurgical generator via an electrosurgical cable extending therebetween, for supplying energy to tissue-contacting surfaces 46, 48 to treat, e.g., seal, tissue grasped between tissue-contacting surfaces 46, 48.

As noted above, actuation assembly 100 is disposed within housing 20 and includes articulation assembly 200, cutting drive assembly 300, and jaw drive assembly 400. Articulation assembly 200 is operably coupled between first and second inputs 110, 120, respectively, of actuation assembly 100 and articulation cables 38 (FIG. 1) such that, upon receipt of appropriate rotational inputs into first and/or second inputs 110, 120, articulation assembly 200 manipulates cables 38 (FIG. 1) to articulate end effector assembly 40 in a desired direction, e.g., to yaw and/or pitch end effector assembly 40. Various configurations of articulation mechanisms forming part of or the entirety of articulation assembly 200 are detailed below with reference to FIGS. 4-8. Cutting drive assembly 300, as noted above, enables reciprocation of the cutting element between jaw members 42, 44 to cut tissue grasped between tissue-contacting surfaces 46, 48 in response to receipt of appropriate rotational input into third input 130. Jaw drive assembly 400 is operably coupled between fourth input 140 of actuation assembly 100 and drive rod 402 (FIG. 6) such that, upon receipt of appropriate rotational input into fourth input 140, jaw drive assembly 400 pivots jaw members 42, 44 between the spaced-apart and approximated positions to grasp tissue therebetween and apply a closure force within an appropriate closure force range.

Actuation assembly 100 is configured to operably interface with a robotic surgical system 500 (FIG. 3) when instrument 10 is mounted on robotic surgical system 500 (FIG. 3), to enable robotic operation of actuation assembly 100 to provide the above-detailed functionality. That is, robotic surgical system 500 (FIG. 3) selectively provides rotational inputs to inputs 110-140 of actuation assembly 100 to articulate end effector assembly 40, grasp tissue between jaw members 42, 44, and/or cut tissue grasped between jaw members 42, 44. However, it is also contemplated that actuation assembly 100 be configured to interface with any other suitable surgical system, e.g., a manual surgical handle, a powered surgical handle, etc. For the purposes herein, robotic surgical system 500 (FIG. 3) is generally described.

Turning to FIG. 3, robotic surgical system 500 is configured for use in accordance with the present disclosure. Aspects and features of robotic surgical system 500 not germane to the understanding of the present disclosure are omitted to avoid obscuring the aspects and features of the present disclosure in unnecessary detail.

Robotic surgical system 500 generally includes a plurality of robot arms 502, 503; a control device 504; and an operating console 505 coupled with control device 504.

Operating console 505 may include a display device 506, which may be set up in particular to display three-dimensional images; and manual input devices 507, 508, by means of which a person, e.g., a surgeon, may be able to telemanipulate robot arms 502, 503 in a first operating mode. Robotic surgical system 500 may be configured for use on a patient 513 lying on a patient table 512 to be treated in a minimally invasive manner. Robotic surgical system 500 may further include a database 514, in particular coupled to control device 504, in which are stored, for example, pre-operative data from patient 513 and/or anatomical atlases.

Each of the robot arms 502, 503 may include a plurality of members, which are connected through joints, and a mounted device which may be, for example, a surgical tool "ST." One or more of the surgical tools "ST" may be instrument 10 (FIG. 1), thus providing such functionality on a robotic surgical system 500.

Robot arms 502, 503 may be driven by electric drives, e.g., motors, connected to control device 504. Control device 504, e.g., a computer, may be configured to activate the motors, in particular by means of a computer program, in such a way that robot arms 502, 503, and, thus, their mounted surgical tools "ST" execute a desired movement and/or function according to a corresponding input from manual input devices 507, 508, respectively. Control device 504 may also be configured in such a way that it regulates the movement of robot arms 502, 503 and/or of the motors.

Figure 4:
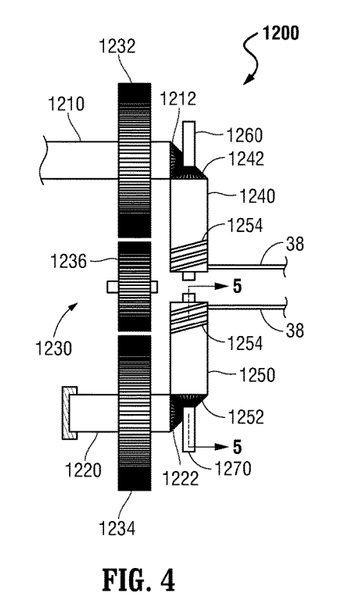
FIG. 4 is a top view of an articulation mechanism configured for use with the surgical instrument of FIG. 1.
Figure 5:
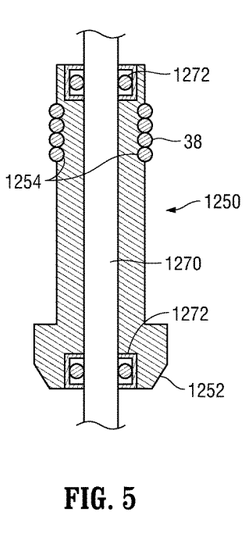
FIG. 5 is a transverse, cross-sectional view taken across section line "5-5" of FIG. 4.
Figure 6:
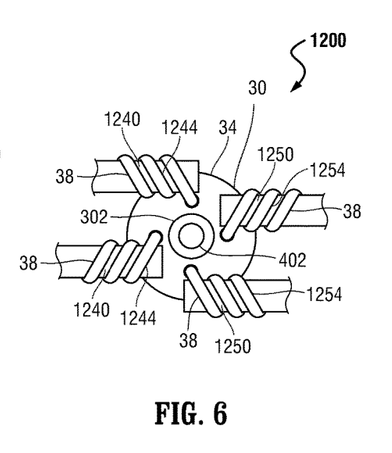
FIG. 6 is a distal end view of the articulation mechanism of FIG. 4.

Turning to FIGS. 4-6, an articulation mechanism 1200 configured for use with articulation assembly 200 (FIG. 2) is detailed. Articulation mechanism 1200 operably couples to the proximal end portions of two articulation cables 38 to enable selective articulation of end effector assembly 40 (FIG. 1) about a first axis of articulation, e.g., to enable yaw articulation. Another articulation mechanism substantially similar to articulation mechanism 1200 may be provided to operably couple to the other two articulation cables 38 (see also FIG. 1) to enable selective articulation of end effector assembly 40 (FIG. 1) about a second axis of articulation, e.g., to enable pitch articulation (see FIG. 6). As the articulation mechanisms 1200 are substantially similar to one another expect with respect to positioning and the articulation cables 38 (see also FIG. 1) to which they couple, only one articulation mechanism 1200 is detailed below. However, it is contemplated that only one articulation mechanism 1200 be provided for single-axis articulation or that more than two articulation mechanisms 1200 be provided to enable more than two axes of articulation.

Articulation mechanism 1200 includes an active input shaft 1210 (see also FIG. 2); a passive input shaft 1220; a gear set 1230 including first, second, and third gears 1232, 1234, 1236, respectively, operably coupling active and passing input shafts 1210, 1220 with one another; first and second capstans 1240, 1250 each including one of the articulation cables 38 wound thereabout; and first and second support shafts 1260, 1270 rotatably mounting first and second capstans 1240, 1250, respectively, thereon. Articulation mechanism 1200 further includes coupling gears 1212, 1242 and 1222, 1252 operably coupling active and passive input shafts 1210, 1220 with first and second capstans 1240, 1250, respectively, such that rotation of input shafts 1210, 1220 effects corresponding rotation of respective capstans 1240, 1250. Some or all of coupling gears 1212, 1222, 1242, 1252 may be defined on or engaged with the corresponding shafts or capstans 1210, 1220, 1240, 1250, respectively.

Continuing with reference to FIGS. 4-6, and with additional reference to FIG. 2, active input shaft 1210 is engaged (directly or indirectly) with one of the articulation inputs of actuation assembly 100, e.g., input 110 such that, upon receipt of an appropriate rotational input to first input 110, active input shaft 1210 is correspondingly rotated. However, it is also contemplated that active input shaft 1210 be engaged with first input 110 in a manner that reverses the rotational input provided to first input 110 and/or amplifies or attenuates the rotational input provided to first input 110. First gear 1232 is fixedly engaged about or formed with active input shaft 1210 such that rotation of active input shaft 1210, e.g., in response to a rotational input to input 110, rotated first gear 1232 similarly.

Passive input shaft 1220 includes second gear 1234 fixedly engaged thereabout or formed therewith and third gear 1236 is disposed between and in meshed engagement with each of first and second gears 1232, 1234. Thus, rotation of active input shaft 1210 in a first direction, e.g., in response to a rotational input to input 110, rotates first gear 1232 in the first direction to thereby rotate third gear 1236 in a second, opposite direction which, in turn, rotates second gear 1234 in the first direction such that passive input shaft 1220 is rotated in the same direction (and at the same rate) as active input shaft 1210.

As noted above, coupling gears 1212, 1242 and 1222, 1252 operably couple active and passive input shafts 1210, 1220 with first and second capstans 1240, 1250, respectively, such that rotation of active and passive input shafts 1210, 1220, e.g., in response to a rotational input to input 110, rotates first and second capstans 1240, 1250 in the second, opposite direction. First and second capstans 1240, 1250 may be oriented substantially perpendicularly relative to active and passive input shafts 1210, 1220, or in any other suitable orientation relative thereto.

First and second capstans 1240, 1250, as also noted above, each include one of the articulation cables 38 wound thereabout. Articulation cables 38 are wound in opposite directions about first and second capstans 1240, 1250 such that rotation of first and second capstans 1240, 1250 in the same direction e.g., in response to a rotational input to input 110, unwinds (slackening) one of the articulation cables 38 and winds-up (tensioning) the other of the articulation cables 38.

First and second support shafts 1260, 1270 rotatably mount first and second capstans 1240, 1250, respectively, thereon, e.g., via bearings 1272 (see FIG. 5). First and second capstans 1240, 1250 include helical grooves 1244, 1254 defined within portions of the outer annular surfaces thereof that are configured to receive articulation cables 38 to guide the winding and unwinding of cables 38 about first and second capstans 1240, 1250. Articulation cables 38 extend from capstans 1240, 1250 in substantially perpendicular orientation (not withstanding the pitch angle of helical grooves 1244, 1254) relative to an axis of rotation of capstans 1240, 1250.

Turning to FIG. 6, the first and second capstans 1240, 1250 of two articulation mechanisms 1200 are shown. As illustrated in FIG. 6, the pairs of capstans 1240, 1250 are oriented such that the capstans 1240, 1250 of one of the articulation mechanisms 1200 (and the corresponding cables 38 coupled thereto) oppose one another and such that the capstans 1240, 1250 of the other articulation mechanism 1200 (and the corresponding cables 38 coupled thereto) oppose one another. Such a configuration is advantageous, as noted above, in that, in a four-cable configuration, coupling opposing pairs of cables 38 such that these cables 38 always slacken and tension opposite of one another enables two-axis articulation while requiring only two inputs, e.g., inputs 110, 120 (FIG. 2).

Continuing with reference to FIG. 6, each capstan 1240, 1250 (and the axis of rotation thereof) is oriented substantially perpendicular to a longitudinal axis of proximal segment 34 of shaft 30 and overlaps with the cylindrical volume of proximal segment 34 of shaft 30. In this manner, since articulation cables 38 extend from capstans 1240, 1250 in substantially perpendicular orientation (not withstanding the pitch angle of helical grooves 1244, 1254) relative to the axis of rotation of capstans 1240, 1250, and since the portions thereof that extend from capstans 1240, 1250 are disposed within the cylindrical volume of proximal segment 34 of shaft 30, articulation cables 38 may extend from capstans 1240, 1250 into proximal segment 34 of shaft 30 in substantially linear orientation and substantially parallel to the longitudinal axis of proximal segment 34 of shaft 30. Thus, pulleys or other direction-altering mechanisms are not required. However, in other aspects, differently oriented capstans 1240, 1250 and/or articulation cables 38 may be provided for use with pulleys or other direction-altering mechanisms to facilitate routing articulation cables 38 into proximal segment 34 of shaft 30.

Figure 7:
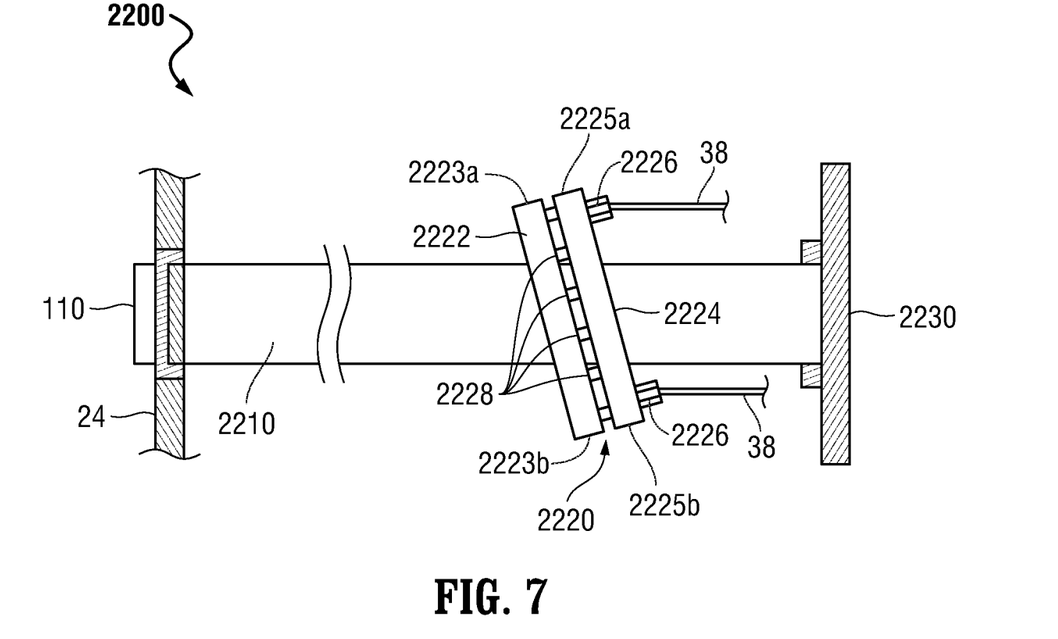
FIG. 7 is a side view of another articulation mechanism configured for use with the surgical instrument of FIG. 1, disposed in a first position.
Figure 8:
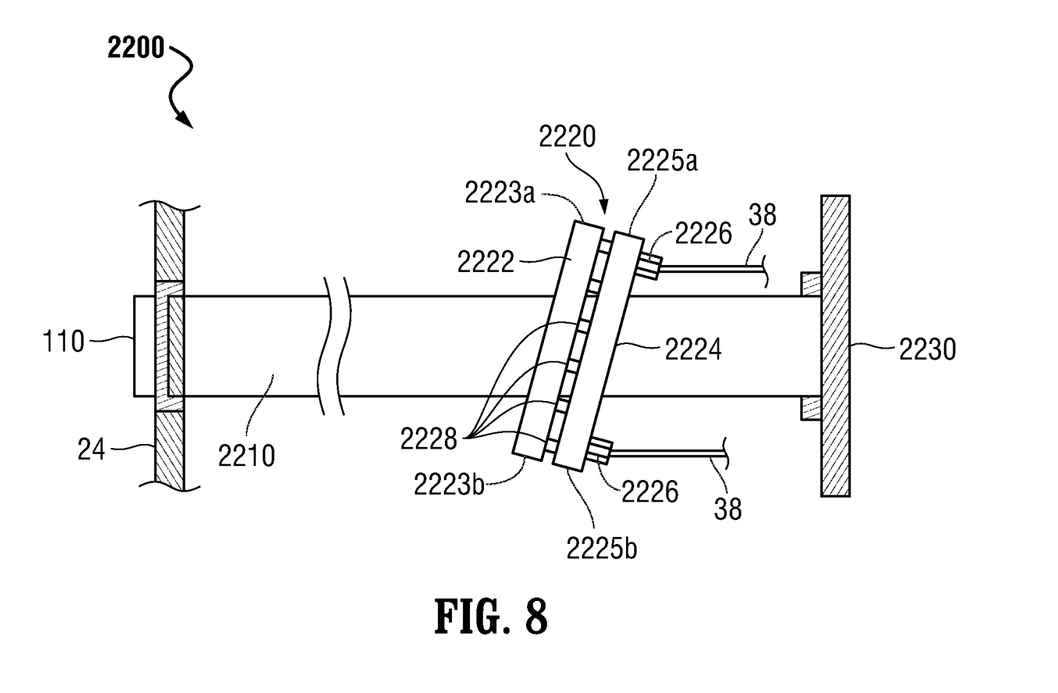
FIG. 8 is a side view of the articulation mechanism of FIG. 7, disposed in a second position.

Turning to FIGS. 7 and 8, another articulation mechanism 2200 configured for use with articulation assembly 200 (FIG. 2) is detailed. Articulation mechanism 2200 operably couples to the proximal end portions of two articulation cables 38 to enable selective articulation of end effector assembly 40 (FIG. 1) about a first axis of articulation, e.g., to enable yaw articulation. Another articulation mechanism substantially similar to articulation mechanism 2200 may be provided to operably couple to the other two articulation cables 38 (see also FIG. 1) to enable selective articulation of end effector assembly 40 (FIG. 1) about a second axis of articulation, e.g., to enable pitch articulation. As the articulation mechanisms 2200 are substantially similar to one another expect with respect to positioning and the articulation cables 38 (see also FIG. 1) to which they couple, only one articulation mechanism 2200 is detailed below. However, it is also contemplated that only one articulation mechanism 2200 be provided for single or multiple-axis articulation, that more than two articulation mechanisms 2200 be provided to enable two or more axes of articulation, or that different types and/or configurations of articulation mechanisms be utilized to achieve any suitable articulation arrangement about one or more axes.

With additional reference to FIG. 2, articulation mechanism 2200 includes an active input shaft 2210 (see also FIG. 2), a swashplate assembly 2220, and a distal plate 2230. Active input shaft 2210 is engaged (directly or indirectly), at one end portion thereof, with one of the articulation inputs of actuation assembly 100, e.g., input 110 mounted within proximal face plate 24, such that, upon receipt of an appropriate rotational input to first input 110, active input shaft 2210 is correspondingly rotated. However, it is also contemplated that active input shaft 2210 be engaged with first input 110 in a manner that reverses the rotational input provided to first input 110 and/or amplifies or attenuates the rotational input provided to first input 110. Active input shaft 2210 is rotatably engaged (directly or indirectly), at the other end portion thereof, with distal plate 2230.

Referring again to FIGS. 7 and 8, swashplate assembly 2220 is operably coupled to active input shaft 2210 and includes a first plate 2222, a second plate 2224, and a plurality of pivot joints 2226, e.g., ball-and-socket or other suitable pivot joints. First plate 2222 is fixedly mounted about active input shaft 2210 at an oblique angle relative thereto such that first plate 2222 includes a first portion 2223a (e.g., a first half-plate) on one side of active input shaft 2210 that extends more distally and a second portion 2223b (e.g., a second half-plate) on the opposite side of active input shaft 2210 that extends more proximally. However, as active input shat 2210 rotates, for example 180 degrees, the first portion 2223a of first plate 2222 is rotated from a first position, e.g., above active input shaft 2210 (FIG. 7), to a second position, e.g., below active input shaft 2210 (FIG. 8), while the second portion 2223b of first plate 2222 is rotated in the opposite manner.

Second plate 2224 is disposed about active input shaft 2210 at an oblique angle relative thereto and is positioned distally adjacent first plate 2222. Second plate 2224 is longitudinally fixed relative to first plate 2222 but is rotatable relative to first plate 2222. This may be accomplished via a plurality of bearings 2228 disposed between first and second plates 2222, 2224 or in any other suitable manner. Since second plate 2224 does not rotate in response to rotation of active input shaft 2210 and first plate 2222, as the different portions 2223a, 2223b of first plate 2222 are rotated in response to rotation of active input shaft 2210 (due to the oblique orientation of first plate 2222 about active input shaft 2210), the first and second portions 2223a, 2223b of first plate 2222 are alternatingly rotated into (and out of) position adjacent first and second portions 2225a, 2225b (e.g., first and second half-plates) of second plate 2224. As a result, when the first, more distally-extending portion 2223a of first plate 2222 is disposed in the first orientation (FIG. 7) above active input shaft 2210, first portion 2225a of second plate 2224 is urged to tilt to a more-distal position while second portion 2225b of second plate 2224 is disposed more-proximally (FIG. 7). On the other hand, when the first, more distally-extending portion 2223a of first plate 2222 is rotated 180 degrees to the second orientation (FIG. 8) below active input shaft 2210, second portion 2225b of second plate 2224 is urged to tilt to a more-distal position while first portion 2225a of second plate 2224 is disposed more-proximally (FIG. 7). Of course, although detailed herein with respect to first and second portions for simplicity, it is understood that the rotation of first plate 2222 and corresponding tilting of second plate 2224 is affected continuously through 360 degrees of rotation and corresponding tilt.

The plurality of pivot joints 2226 are engaged with or formed on a distal face of second plate 2224 and extend distally therefrom. Pivot joints 2226 are positioned such that with second plate 2224 disposed about active input shaft 2210, pivot points 2226 are arranged radially about active input shaft 2210. At least one pair of opposed pivot joints 2226 is provided wherein one pivot joint 2226 of each pair extends from first portion 2225a of second plate 2224 and the opposed pivot joint 2226 of the pair extends from second portion 2225b of second plate 2224. In this manner, when one pivot joint 2226 of the pair is more-distally positioned, the other pivot joint 2226 of the pair is more-proximally positioned, and vice versa. However, more pivot joints 2226 may be provided on first and second portions 2225a, 2225b and/or other portions of second plate 2224 such that opposing pivot joints 2226 or other corresponding pairs of pivot joints 2226 move in coordinated manners relative to one another as active input shaft 2210 is driven to rotate.

Each pivot joint 2226 is configured to pivotably capture a proximal end portion of one of the articulation cables 38 (or other structures that, in turn, attach to the proximal end portions of articulation cables 38) in fixed longitudinal orientation while allowing for relative pivoting between the proximal end portions of articulation cables 38 and second plate 2224. Pivot joints 2226 may be ball-and-socket joints or other suitable pivot joints. As a result of the above-detailed configuration, as second plate 2224 is tilted from the first orientation (FIG. 7) to the second orientation (FIG. 8), first portion 2225a of second plate 2224 is urged to tilt from the more-distal position to the more-proximal direction and second portion 2225b of second plate 2224 is urged to tilt in the opposite manner such that the articulation cable(s) 38 pivotably coupled to first portion 2225a of second plate 2224 are slackened while the articulation cable(s) 38 pivotably coupled to second portion 2225b of second plate 2224 are tensioned. Likewise, as second plate 2224 is tilted from the second orientation (FIG. 8) back to the first orientation (FIG. 7), the articulation cable(s) 38 pivotably coupled to first portion 2225a of second plate 2224 are tensioned while the articulation cable(s) 38 pivotably coupled to second portion 2225b of second plate 2224 are slackened.

In some configurations, second plate 2224 defines an intermediate position wherein the articulation cables 38 pivotably coupled to first and second portions 2225a, 2225b of second plate 2224 are substantially equally tensioned, e.g., corresponding to an un-articulated position of end effector assembly 40 (FIG. 1), such that, upon rotation of active input shaft 2210 in a first direction, second plate 2224 is urged towards the first orientation (FIG. 7), e.g., up to 90 degrees of rotation from the intermediate position, to articulate end effector assembly 40 (FIG. 1) in a first direction and such that, upon rotation of active input shaft 2210 in a second, opposite direction, second plate 2224 is urged towards the second orientation (FIG. 7), e.g., up to 90 degrees of rotation from the intermediate position, to articulate end effector assembly 40 (FIG. 1)) in a second, opposite direction.

Return to an un-articulated position of end effector assembly 40 (FIG. 1) may be achieved in the opposite manners as detailed above (depending upon the direction of articulation). Alternatively, in order to return to the un-articulated position of end effector assembly 40 (FIG. 1) from an articulated position, active input shaft 2210 may be further rotated in the same direction utilized to achieve the articulated position, e.g., beyond 90 degrees of rotation from the intermediate position to 180 degrees of rotation, thereby achieving a second intermediate position corresponding to the un-articulated position of end effector assembly 40 (FIG. 1)). Thus, in some configurations, active input shaft 2210 need only be capable of rotation in a single direction. In configurations where active input shaft 2210 is rotatable in both directions, achieving and moving between various articulated positions and/or the un-articulated positioned may be achieved via driving active input shaft 2210 in either direction, depending upon, for example, the relative positioning between the positions, an articulation path of movement between the positions, a shortest-distance determination, and/or other factors.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:
1. A surgical instrument, comprising:
a housing;
a shaft extending distally from the housing, the shaft including a proximal section defining a longitudinal axis and an articulating section extending distally from the proximal section;
an end effector assembly extending distally from the articulating section of the shaft, wherein the articulating section of the shaft is configured to articulate the end effector assembly relative to the proximal section of the shaft;
first and second articulation cables extending from the housing and through the proximal section of the shaft to or through the articulating section of the shaft, wherein tensioning the first articulation cable and slackening the second articulation cable articulates the end effector assembly in a first direction and wherein slackening the first articulation cable and tensioning the second articulation cable articulates the end effector assembly in a second, opposite direction; and
an articulation assembly disposed within the housing and including an articulation mechanism, the articulation mechanism including:
an active input shaft configured, in response to receipt of a first rotational input, to rotate in a first direction and, in response to receipt of a second, opposite rotational input, to rotate in a second direction opposite the first direction;
a first capstan operably coupled to the active input shaft and including a proximal end portion of the first articulation cable at least partially wound thereabout;
a passive input shaft operably coupled to the active input shaft so that rotation of the active input shaft in the first direction drives rotation of the passive input shaft in the first direction and so that rotation of the active input shaft in the second direction drives rotation of the passive input shaft in the second direction; and
a second capstan operably coupled to the passive input shaft and including a proximal end portion of the second articulation cable at least partially wound thereabout,
wherein, in response to rotation of the active input shaft in the first direction, the active input shaft drives rotation of:
the first capstan to wind up the proximal end portion of the first articulation cable about the first capstan to tension the first articulation cable, and
the passive input shaft to thereby drive rotation of the second capstan to unwind the proximal end portion of the second articulation cable from the second capstan to slacken the second articulation cable, and
wherein, in response to rotation of the active input shaft in the second direction, the active input shaft drives rotation of:
the first capstan to unwind the proximal end portion of the first articulation cable from the first capstan to slacken the first articulation cable, and
the passive input shaft to thereby drive rotation of the second capstan to wind the proximal end portion of the second articulation cable about the second capstan to tension the second articulation cable.
2. The surgical instrument according to claim 1, wherein each of the first and second capstans defines an axis of rotation that is substantially perpendicular relative to the longitudinal axis of at least one of the active or passive input shafts.

3. The surgical instrument according to claim 1, wherein each of the first and second articulation cables extends from the respective first and second capstans in substantially parallel orientation relative to the longitudinal axis of the proximal section of the shaft.

4. The surgical instrument according to claim 1, wherein at least one of the first or second articulation cables extends from the respective first or second capstans, the at least one of the first or second articulation cables in overlapping relation with a cylindrical volume defined within the proximal section of the shaft.

5. The surgical instrument according to claim 1, wherein each of the first and second articulation cables extends from the respective first and second capstans, each of the first and second articulation cables in overlapping relation with a cylindrical volume defined within the proximal section of the shaft.

6. The surgical instrument according to claim 1, wherein the active input shaft is operably coupled to the first and second capstans so that rotation of the active input shaft rotates the first and second capstans in the same direction as one another.

7. The surgical instrument according to claim 6, wherein the active input shaft includes a first coupling gear meshed with a gear of the first capstan to directly transfer rotational motion thereto.

8. The surgical instrument according to claim 7, wherein the passive input shaft includes a second coupling gear meshed with a gear of the second capstan to directly transfer rotational motion thereto.

9. The surgical instrument according to claim 6, wherein the proximal end portion of the first articulation cable is wound about the first capstan in a first direction and wherein the proximal end portion of the second articulation cable is wound about the second capstan in a second, opposite direction.

10. The surgical instrument according to claim 1, wherein the passive input shaft is operably coupled to the active input shaft by a gear set.

11. The surgical instrument according to claim 10, wherein the gear set includes a first gear disposed about the active input shaft, a second gear disposed about the passive input shaft, and a third gear coupling the first and second gears with one another.

12. The surgical instrument according to claim 1, wherein the winding of the proximal end portion of the first articulation cable about the first capstan and the unwinding of the proximal end portion of the second articulation cable from the second capstan in response to rotation of the active input shaft in the first direction are equal in magnitude.

13. The surgical instrument according to claim 1, wherein the unwinding of the proximal end portion of the first articulation cable from the first capstan and the winding of the proximal end portion of the second articulation cable about the second capstan in response to rotation of the active input shaft in the second direction are equal in magnitude.

14. The surgical instrument according to claim 1, wherein at least one of the first or second capstans defines an axis of rotation that is substantially perpendicular relative to a longitudinal axis of at least one of the active or passive input shafts.

\* \* \* \* \*